(12) United States Patent
Fujita

(10) Patent No.: US 8,913,950 B2
(45) Date of Patent: Dec. 16, 2014

(54) RADIO RELAY METHOD, BASE STATION APPARATUS, AND RELAY STATION APPARATUS

(71) Applicant: Fujitsu Limited, Kawasaki-shi, Kanagawa (JP)

(72) Inventor: Hiroshi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/268,601

(22) Filed: May 2, 2014

(65) Prior Publication Data
US 2014/0241195 A1    Aug. 28, 2014

Related U.S. Application Data

(60) Division of application No. 12/874,631, filed on Sep. 2, 2010, now abandoned, which is a continuation of application No. PCT/JP2008/000724, filed on Mar. 26, 2008.

(51) Int. Cl.
| | |
|---|---|
| *H04B 3/36* | (2006.01) |
| *H04B 7/14* | (2006.01) |
| *H04B 7/155* | (2006.01) |
| *H04B 17/02* | (2006.01) |
| *H04W 24/08* | (2009.01) |

(52) U.S. Cl.
CPC ........ *H04B 7/15557* (2013.01); *H04B 7/15521* (2013.01); *H04B 17/02* (2013.01); *H04W 24/08* (2013.01)
USPC .......................................................... 455/7

(58) Field of Classification Search
USPC .......................................................... 455/7
See application file for complete search history.

(56) References Cited

U.S. PATENT DOCUMENTS

| | | | |
|---|---|---|---|
| 2007/0190934 A1* | 8/2007 | Kim et al. ........................ | 455/7 |
| 2008/0043647 A1 | 2/2008 | Yoshida et al. | |
| 2008/0194267 A1* | 8/2008 | Ahn et al. ..................... | 455/450 |
| 2008/0207117 A1* | 8/2008 | Lim et al. .......................... | 455/9 |
| 2008/0220790 A1* | 9/2008 | Cai et al. ........................ | 455/450 |
| 2008/0310348 A1* | 12/2008 | Nandagopalan et al. ..... | 370/328 |

(Continued)

FOREIGN PATENT DOCUMENTS

| | | |
|---|---|---|
| JP | 2001156692 | 6/2001 |
| JP | 2007043524 | 2/2007 |

(Continued)

OTHER PUBLICATIONS

Final Office Action dated Jan. 29, 2014 received in U.S. Appl. No. 12/874,631.

(Continued)

*Primary Examiner* — Ankur Jain
(74) *Attorney, Agent, or Firm* — Smith, Gambrell & Russell, LLP

(57) ABSTRACT

A radio relay method for relaying signal transmitted and received between a base station apparatus and a mobile station apparatus, the radio relay method including: selecting a first relay method amplifying and transmitting reception signal, or a second relay method decoding, error correcting, re-encoding, and transmitting the reception signal, based on each reception quality between the relay station apparatus and the base station apparatus and between the relay station apparatus and the mobile station apparatus; and relaying the signal based on the selected first relay method or the selected second relay method.

7 Claims, 11 Drawing Sheets

(56) References Cited

U.S. PATENT DOCUMENTS

| | | |
|---|---|---|
| 2009/0017814 A1 | 1/2009 | Horiuchi et al. |
| 2009/0047898 A1 | 2/2009 | Imamura et al. |
| 2009/0092072 A1 | 4/2009 | Imamura et al. |
| 2009/0227201 A1 | 9/2009 | Imai et al. |

FOREIGN PATENT DOCUMENTS

| | | |
|---|---|---|
| JP | 2007324960 | 12/2007 |
| JP | 2008048237 | 2/2008 |
| WO | 2006090669 A1 | 8/2006 |
| WO | 2006098273 A1 | 9/2006 |
| WO | 2006104105 A1 | 10/2006 |
| WO | 2006118125 A1 | 11/2006 |

OTHER PUBLICATIONS

Non-Final Office Action dated Aug. 7, 2013 received in U.S. Appl. No. 12/874,631.
Final Office Action dated Mar. 29, 2013 received in U.S. Appl. No. 12/874,631.
Non-Final Office Action dated Aug. 24, 2012 received in U.S. Appl. No. 12/874,631.
Office Action dated Dec. 27, 2011 issued in corresponding Japanese Patent Application No. 2010-505026.
International Search Report dated May 13, 2008 in corresponding International application No. PCT/JP2008/000724.
IEEE P802.16j/D1 (Aug. 2007) Draft Standard for Local and Metropolitan Area Networks Part 16: Air Interface for Fixed and Mobile Broadband Wireless Access Systems Multihop Relay Specification.

* cited by examiner

RADIO RELAY SYSTEM 1

RADIO RELAY SYSTEM 1

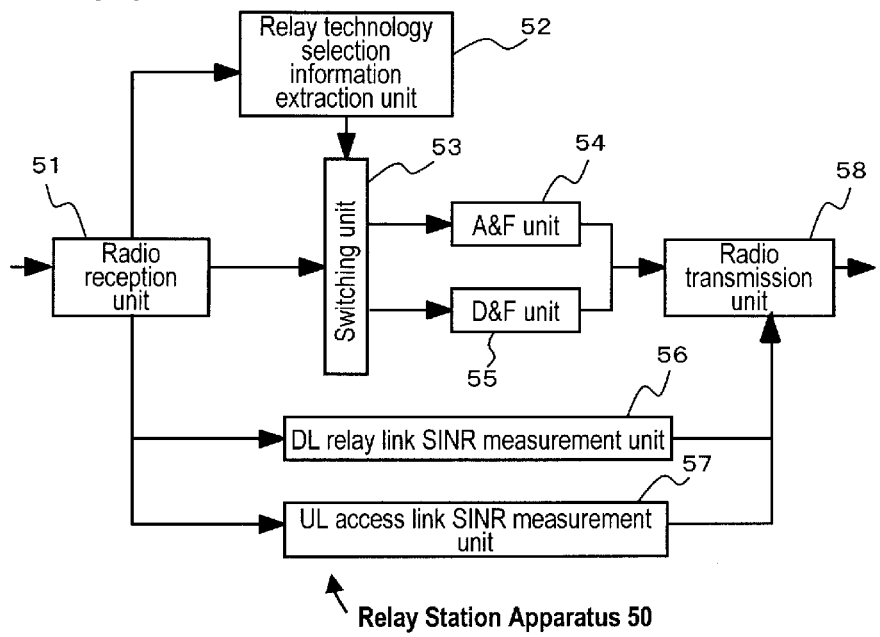
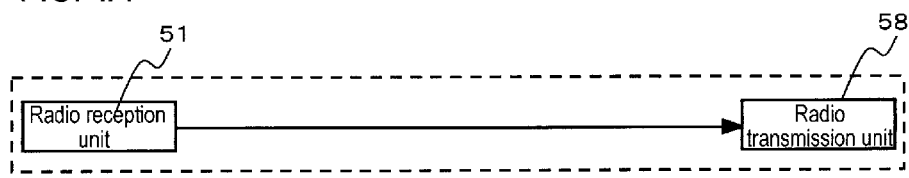
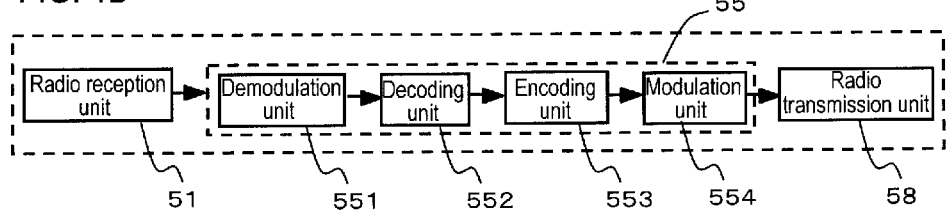

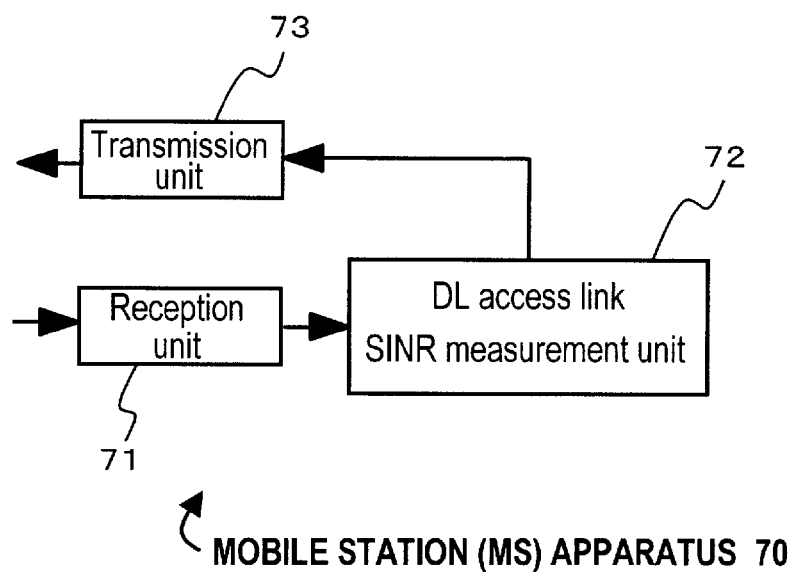

FIG. 13

| Item | Case1 | Case2 |
|---|---|---|
| $SINR_{relay, A\&F}$ | 11.5dB | 20dB |
| $SINR_{relay, D\&F}$ | 11.5dB | 20dB |
| $SINR_{access, A\&F}$ | 10dB | 10dB |
| $SINR_{access, D\&F}$ | 10dB | 10dB |

FIG. 14

| Item | Value |
|---|---|
| $D_{A\&F}$ | 1 frame |
| $D_{D\&F}$ | 2 frame |

RADIO RELAY METHOD, BASE STATION APPARATUS, AND RELAY STATION APPARATUS

CROSS REFERENCE TO RELATED APPLICATIONS

This application divisional of U.S. application Ser. No. 12/874,631, filed Sep. 2, 2010, now pending, which is a continuation of International Application No. PCT/JP2008/000724, filed on Mar. 26, 2008, now pending, herein incorporated by reference.

FIELD

The embodiments discussed herein are related to a radio relay method, base station apparatus, and relay station apparatus.

BACKGROUND

There is a radio relay system via a relay station (RS) apparatus (see, for example, IEEE 802.16j). Received electric powers of a base station (ES) apparatus and mobile station (MS) apparatus improves because the base station apparatus and mobile station apparatus receive signal via the relay station apparatus. And, the base station apparatus can extend a transmission range of radio wave, and it can be attempted to improve location efficiency.

There are two kinds, A&F (Amplify and Forward) method and D&F (Decode and Forward) method, with respect to radio relay technology of the relay station apparatus and so on (see, for example, IEEE 802.16j).

In the A&F method, power amplification of reception signal and similar are performed without demodulation, decoding, re-encoding, re-modulation and so on, and received signal is transmitted, so that it can shorten a processing delay and suppress a relay delay. However, in the A&F method, noise and interference prior to relay are amplified and transmitted with the reception signal, so that a reception quality (for example, SINR (Signal to Interference and Noise Ratio)) deteriorates at a relay point.

On the other hand, the D&F method is a relay technology that the reception signal is decoded, error corrected, re-encoded, and transmitted. In the D&F method, error correction is performed, so that it can reduce the noise and interference prior to relay. However, in the D&F method, the processing of decoding, encoding, and so on are performed, so that the processing delay is bigger than the A&F method.

Furthermore, in the prior radio relay technology, it is discussed to control whether it performs frame encode processing after it performed frame decode processing for the reception signal, based on a manual operation, error rate, reception electric field strength, error bit number, or data type and the reception signal is transmitted, or it performs the fame encode processing without performing the frame decode processing and the reception signal is transmitted (see, for example, Japanese Laid-open Patent Publication No. 2001-156692).

However, in the prior art, the relay station performs the frame encode processing without performing the frame decode processing, so that the mobile station performs decode processing for two times, and a processing of the mobile station becomes complicated.

SUMMARY

According to an aspect of the invention, a radio relay method for relaying signal transmitted and received between a base station apparatus and a mobile station apparatus, the radio relay method including: selecting a first relay method amplifying and transmitting reception signal, or a second relay method decoding, error correcting, re-encoding, and transmitting the reception signal, based on each reception quality between the relay station apparatus and the base station apparatus and between the relay station apparatus and the mobile station apparatus; and relaying the signal based on the selected first relay method or the selected second relay method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 illustrates a configuration example of a relay station (RS) apparatus;

FIG. 4A illustrates a configuration example of a signal processing system of A&F method and FIG. 4B illustrates a configuration example of a signal processing system of D&F method;

FIG. 5 illustrates a configuration example of a mobile station (MS) apparatus;

FIG. 13 illustrates an example of SINR value;

FIG. 14 illustrates an example of relay delay value;

DESCRIPTION OF EMBODIMENTS

Preferred embodiments of the present invention will be explained below.

[First Embodiment]

Figure 1A:
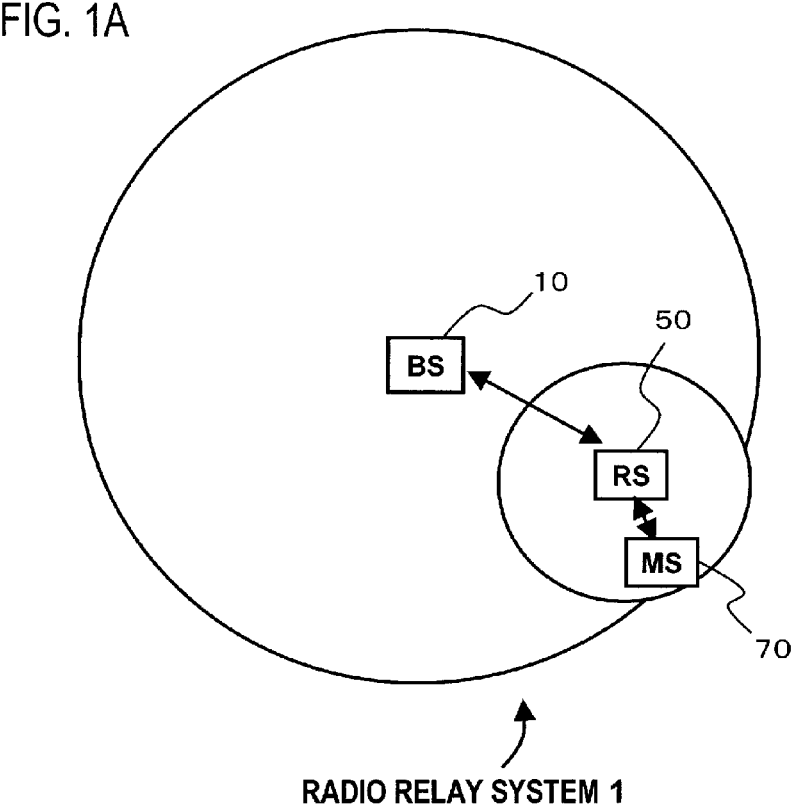
FIG. 1A and FIG. 1B illustrate a configuration example of a radio relay system.
Figure 1B:
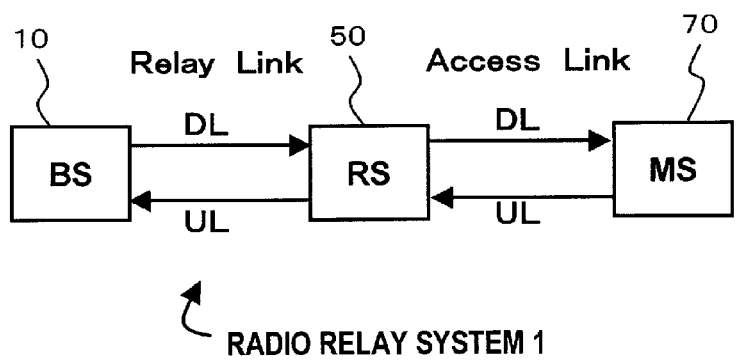

FIG. 1A and FIG. 1B illustrates a configuration example of a radio relay system 1. The radio relay system 1 includes a base station (BS) apparatus (hereafter "base station") 10, a relay station (RS) apparatus (hereinafter "relay station") 50, and a mobile station (MS) apparatus (hereinafter "mobile station") 70.

The base station 10 communicates with the mobile station 70 via the relay station 50 (Down Link (DL)), and the mobile station 70 communicates with the base station 10 via the relay station 50 (Up Link (UL)).

Furthermore, hereinafter, a communication between the base station 10 and the relay station 50 is called as a relay link (Relay Link), and a communication between the relay station 50 and the mobile station 70 is called as an access link (Access Link).

Figure 2:
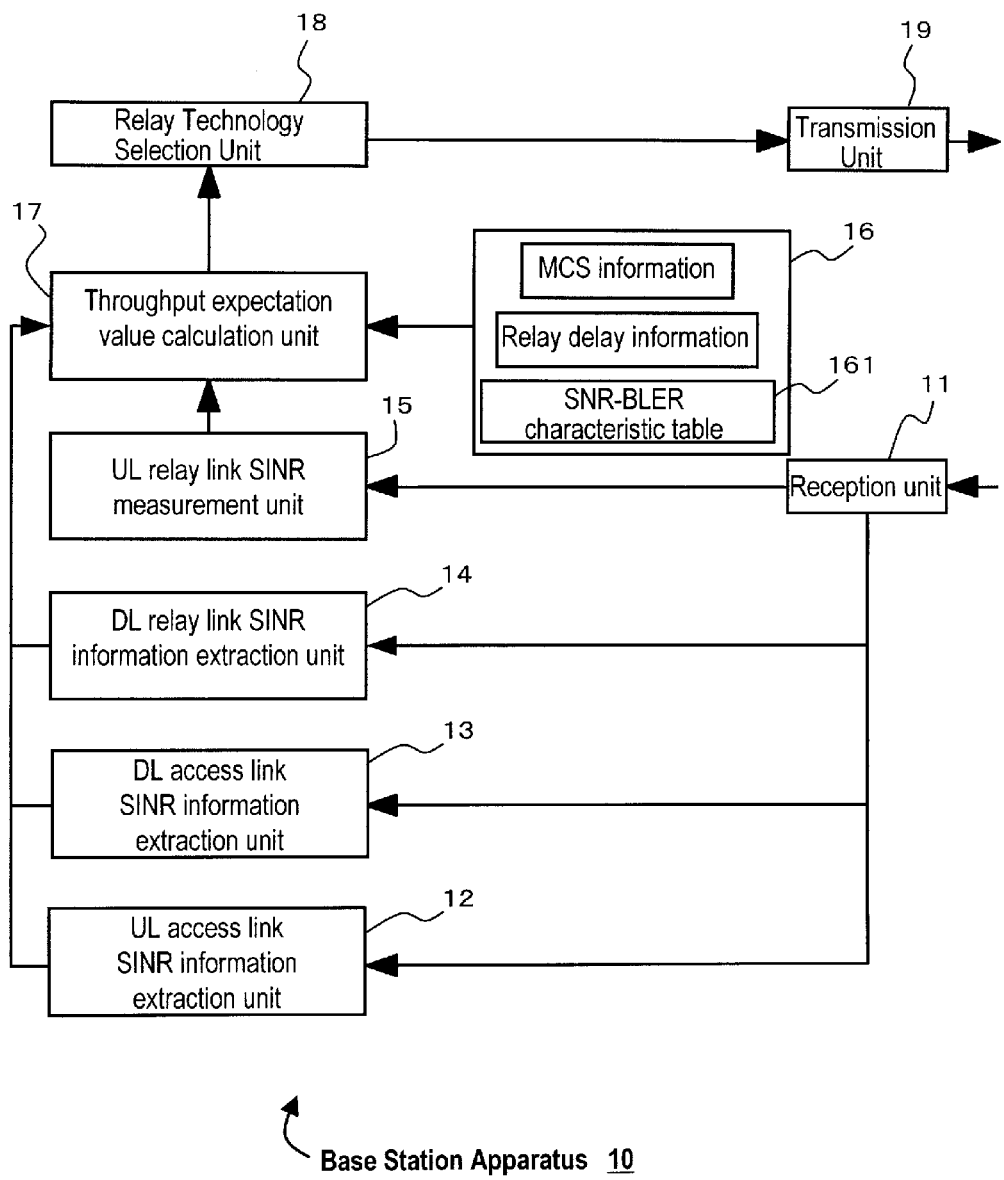
FIG. 2 illustrates a configuration example of a base station (BS) apparatus.

Next, configuration examples of the base station 10, relay station 50, and mobile station 70 are explained. FIG. 2 illustrates the configuration example of the base station 10, FIG. 3 and FIG. 4 illustrate configuration examples of the relay station 50, and FIG. 5 illustrates the configuration example of the mobile station 70.

The base station 10, as illustrated in FIG. 2, includes a reception unit 11, UL access link SINR information extraction unit 12, DL access link SINR information extraction unit 13, DL relay link SINR information extraction unit 14, UL relay link SINR measurement unit 15, memory 16, throughput expectation value calculation unit 17, relay technology selection unit 18, and transmission unit 19. Further, the memory 16 stores MCS (Modulation and Coding Scheme) information, relay delay information, and SNR (Signal to Noise Ratio)-BLER (Block Error Rate, hereinafter "error rate") characteristic table 161. The MCS information and so on will be explained below.

The reception unit 11 receives signal transmitted from the relay station 50. For example, the reception unit 11 receives signal indicating each reception quality (using SINR information as an example of the reception quality) measured by the relay station 50 and the mobile station 70.

The reception quality (explaining as adapting SINR as follows) information, for example, is SINR of DL and UL direction in each link of the relay link and the access link. For example, the SINR of UL direction in the relay link is measured by the base station 10 it's self, and another SINR are measured by the relay station 50 and the mobile station 70 and transmitted to the base station 10.

The reception unit 11 receives each SINR information and outputs the UL access link SINR information extraction unit 12, DL access link SINR information extraction unit 13, and DL relay link SINR information extraction unit 14.

The UL access link SINR information extraction unit 12 extracts UL Access SINR information of the SINR information output from the reception unit 11, outputs to the throughput expectation value calculation unit 17. The UL Access SINR information is an information indicating SINR value of the UL direction in the access link. For example, this information is measured by the mobile station 70.

The DL access link SINR information extraction unit 13 extracts DL Access SINR information of the SINR information output from the reception unit 11, and outputs to the throughput expectation value calculation unit 17. The DL Access SINR information is an information indicating SINR value of the DL direction in the access link. For example, this information is measured by the mobile station 70.

The DL relay link SINR information extraction unit 14 extracts DL relay SINR information of the SINR information output from the reception unit 11, and outputs the throughput expectation value calculation unit 17. The DL relay SINR information is an information indicating SINR value of the DL direction in the relay link. For example, this information is measured by the relay station 50.

The UL relay link SINR measurement unit 15 measures SINR of the UL direction in the relay link (UL relay SINR), base on reception signal (for example, SINR measurement use signal, or each SINR information transmitted from the relay station 50) output from the reception unit 11, and outputs to the throughput expectation value calculation unit 17.

The UL relay SINR is an information indicating SINR value of the UL direction in the relay link.

The throughput expectation value calculation unit 17 calculates throughput expectation values of an A&F method and D&F method respectively, based on each SINR, and the MCS information, relay delay information, and the SNR-BLER characteristic table 161 read from the memory 16, and outputs to the relay technology selection unit 18. Calculation of the throughput expectation value is explained below.

The relay technology selection unit 18 selects the one method which throughput expectation value is better than the other method, based on throughput expectation values of difference relay method (for example, the A&F method without performing demodulation, decoding, re-encoding, and re-modulation, and the D&F method performing the demodulation, decoding, re-encoding, and re-modulation) respectively, and outputs the selected method as relay technology selection information to the transmission unit 19.

The transmission unit 19 transmits the relay technology selection information, signal indicating transfer signal including user data (hereinafter "transfer signal"), SINR measurement use signal and so on, to the relay station 50.

As illustrated in FIG. 3, the relay station 50 includes a radio reception unit 51, relay technology selection information extraction unit 52, switching unit 53, A&F unit 54, D&F unit 55, DL relay link SINR measurement unit 56, UL access link SINR measurement unit 57, and radio transmission unit 58.

The radio reception unit 51 is receives signal transmitted from the base station 10 and mobile station 70. The radio reception unit 51 outputs the SINR measurement use signal to the DL relay link SINR measurement unit 56 and UL access link SINR measurement unit 57, signal including the relay technology selection information to the relay technology selection information extraction unit 52, and the transfer signal to the switching unit 53.

The relay technology selection information extraction unit 52 extracts the relay technology selection information transmitted form the base station 10, and outputs to the switching unit 53.

The switching unit 53 outputs to either one of the A&F unit 54 and the D&F unit 55 the transfer signal output from the radio reception unit 51, based on the relay technology selection information. In other words, if the relay technology selection information indicates to select the A&F method, the switching unit 53 the transfer signal to the A&F unit 54, and if the relay technology selection information indicates to select the D&F method, the switching unit 53 outputs the transfer signal to the D&F unit 55.

The A&F unit (a signal processing unit (called as a non demodulation type signal processing in the meaning of without performing demodulation)) 54 outputs the transfer signal to the radio transmission unit 58 without performing the processing of demodulation, decoding, encoding, modulation and so on, with respect to the transfer signal output from the switching unit 53. FIG. 4A illustrates an example of signal processing system including the A&F unit 54. The demodulation and so on of the transfer signal may not be performed in the A&F unit 54, especially. The A&F unit 54 preferably performs amplifier processing to the transfer signal by including an amplifier unit, or the radio transmission unit 58 preferably amplify the transfer signal.

The D&F unit (a signal processing (called as a demodulation type signal processing in the meaning of performing the demodulation)) 55 demodulates, decodes, error corrects, re-encodes, and re-modulates the transfer signal, and outputs to the radio transmission unit 58. The D&F unit 55 preferably includes the amplifier unit. FIG. 4B illustrates an example of signal processing system including the D&F unit 55. The D&F unit 55 includes a demodulation unit 551, decoding unit 552, encoding unit 553, and modulation unit 554. The transfer signal is demodulated by the demodulation unit 551, decoded by the decoding unit 552, and error corrected in the decoding unit 552. And, the error corrected data is encoded by the encoding unit 553, modulated by the modulation unit 554, and outputted to the radio transmission unit 58. Further, encoding rate (for example, 1/2, or 1/3) and modulation scheme (for example, QPSK, or 16 QAM) are transmitted (noticed) from the base station 10, the decoding unit 552, encoding unit 553, modulation unit 554 and so on perform encoding and so on, based on information of the encoding rate and modulation scheme. Further, the modulation unit 551 can include FFT processing in the reception processing to perform the reception processing corresponding to transmission processing, if IFFT processing is performed to adapt OFDMA in the transmission processing.

The DL relay link SINR measurement unit 56 extracts SINR measurement use signal transmitted from the base station 10, measures SINR of the DL direction in the relay link (DL Relay SINR), and outputs to the radio transmission unit 58.

The UL access link SINR measurement unit 57 extracts SINR measurement use signal transmitted from the mobile station 70, measures SINR of the UL direction in the access link (UL Access SINR), and outputs to the radio transmission unit 58.

The radio transmission unit 58 transmits the transfer signal output from the A&F unit 54 or the D&F unit 55 to the mobile station 70 or the base station 10. And, the radio transmission unit 58 transmits DL Relay SINR information and UL Access SINR information.

As illustrated in FIG. 5, the mobile station 70 includes a reception unit 71, DL access link SINR measurement unit 72, and transmission unit 73.

The reception unit 71 receives the transfer signal or the SINR measurement use signal transmitted from the relay station 50, and outputs to the DL access link SINR measurement unit 72 the SINR measurement use signal of the reception signal.

The DL access link SINR measurement unit 72 measures SINR of the DL direction in the access link (DL Access SINR), based on the SINR measurement use signal, to the transmission unit 73.

The transmission unit 73 transmits the measured DL Access SINR to the relay station 50. Further, the relay station 50 receives the DL access SINR information as the transfer signal, and transmits to the base station 10 via the radio reception unit 51 to the switching unit 53 and so on.

Figure 6:
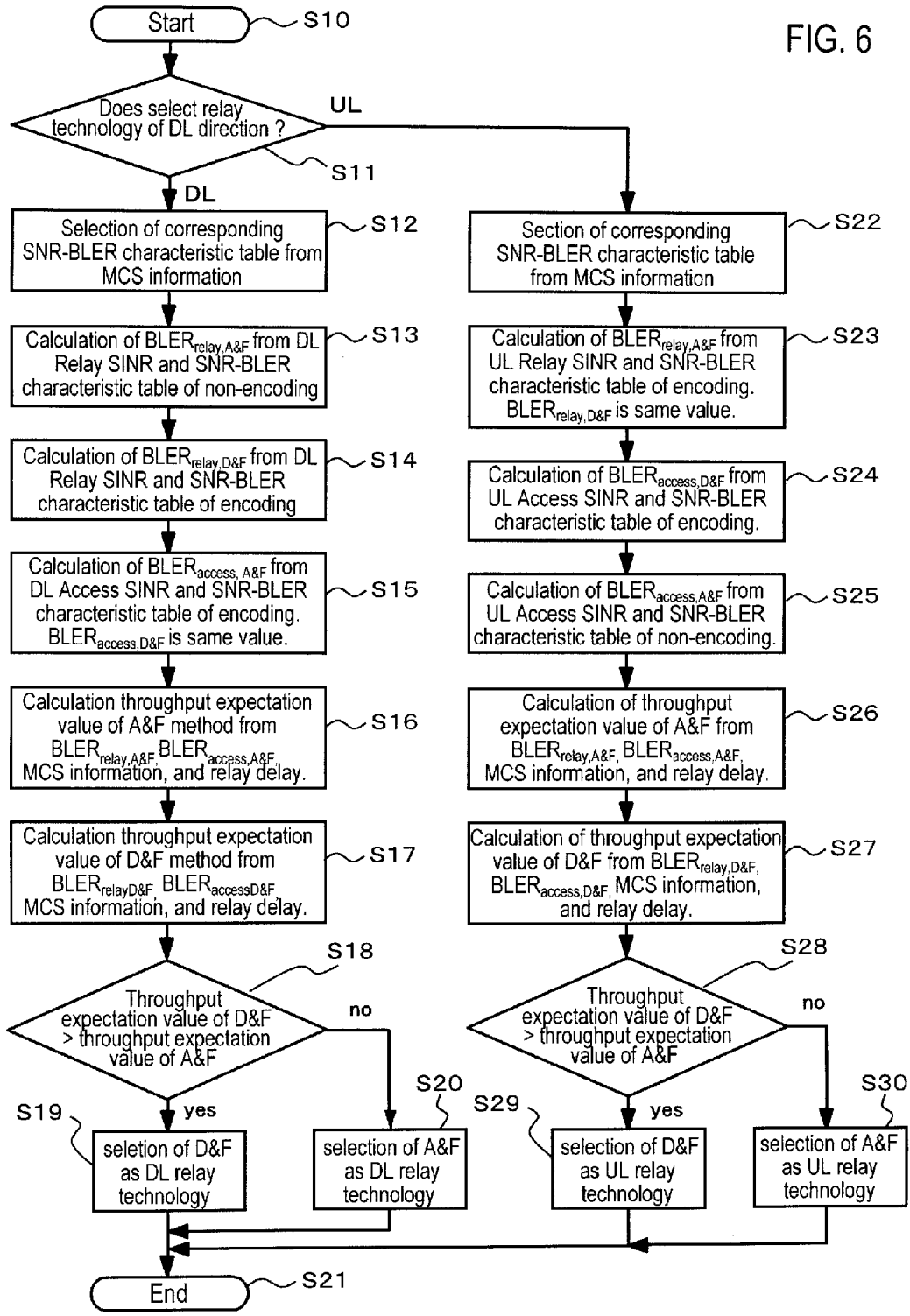
FIG. 6 illustrates a flowchart of an example of a relay technology selection processing.

Next, each processing of the calculation of throughput expectation value and the selection of relay technology in the base station 10 is explained. FIG. 6 illustrates a flowchart indicating an example of the processing. The processing is performed by the throughput expectation value calculation unit 17 and relay technology selection unit 18 of the base station 10, mainly.

The base station 10 starts the processing (S10), and selects the DL direction or the UL direction (S11). The base station 10 generates schedule information in advance upon scheduling, and selects by that present time is timing of the DL direction or timing of the UL direction on the basis of the schedule information. For example, the selection is performed by the throughput expectation value calculation unit 17.

If the DL direction ("DL" in S11), the throughput expectation value calculation unit 17 selects the SNR-BLER characteristic table 161 corresponding to the MCS information (S12).

The MCS information is an information indicating a set of the modulation scheme (QPSK, 16 QAM, or similar) and encoding rate (1/2, 3/4, or similar). For example, the MCS information is stored in the memory 16 if the base station 10 performs the scheduling.

Figure 7:
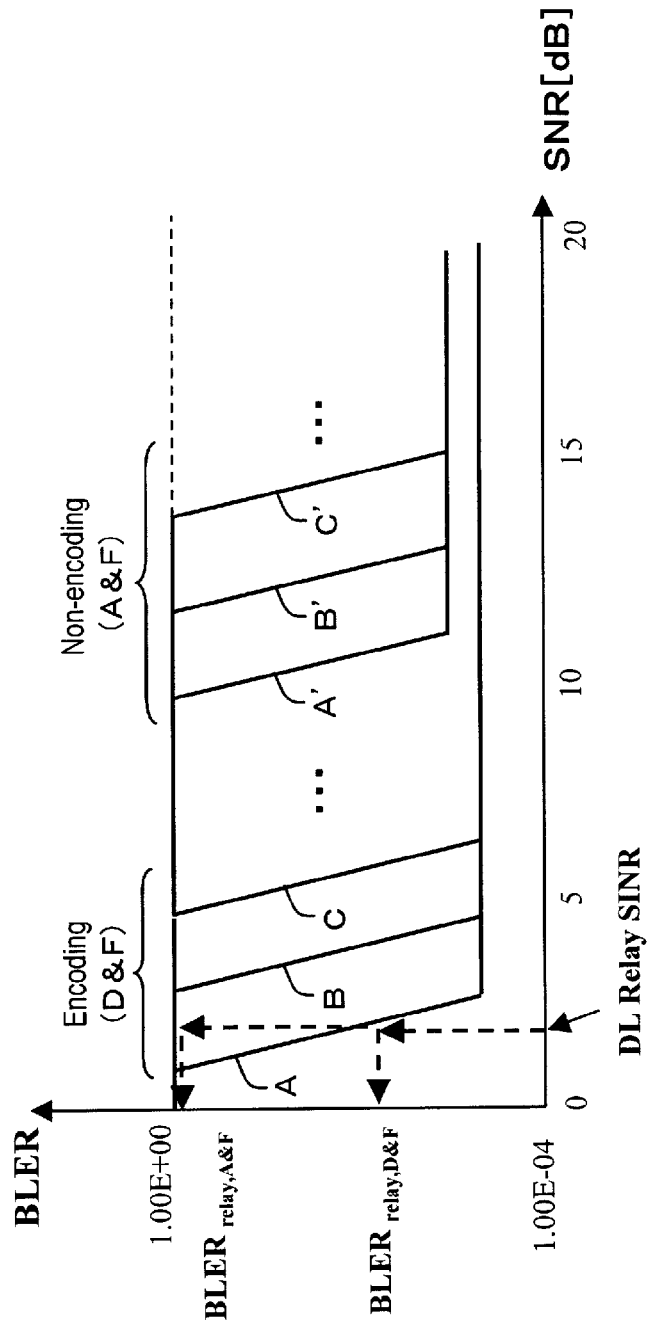
FIG. 7 illustrates an example of SNR-BLER characteristic table.

The SNR-BLER characteristic table 161 is a table indicating relation SNR and error rate, and includes a plurality of characteristic tables correspondingly to the MCS information. FIG. 7 illustrates an example of the SNR-BLER characteristic table 161.

As illustrated in FIG. 7, the characteristic table 161 includes table groups of encoding A, B, C, . . . , and table groups of non-encoding A', B', C', . . . .

The table groups of encoding A, B, C, . . . are table groups indicating the error rate to the SNR when the relay station 50 encodes (the D&F method). The reason is because each of the group corresponds to each of the MCS information respectively that there is plurality of the groups. For example, the characteristic table A indicates a table which the modulation scheme is "QPSK" and the encoding rate is "1/2", the table B indicates a table which the modulation scheme is "QPSK" and the encoding rate "3/4".

On the other hand, the table groups of non-encoding A', B', C', . . . are table groups indicating the error rate to the SNR when the relay station 50 does not perform encoding (the A&F method). The reason is because each of the group corresponds to each of the MCS information respectively that there is plurality of the groups. For example, the table A' is a table of "QPSK" and non encoding, and the table B' is a table of "16 QAM" and non encoding.

For example, the throughput expectation value calculation unit 17 selects the characteristic table of encoding A and the characteristic table of non-encoding A', if the throughput expectation value calculation unit 17 reads an information of "QPSK" and "1/2" as the MCS information from memory 16 (the base station 10 transmits the signal by this modulation scheme and this encoding rate by the scheduling).

Further, FIG. 7 is illustrated by a list form for easily explaining, the memory 16 stores value indicating a set of the SNR and BLER as the characteristic table 161. The throughput expectation value calculation unit 17 calculates set of value not stored in the memory 16 by interpolation. Furthermore, it is explained as same with the interference and the noise, and as same value with SNR and SINR, in the embodiment.

As is clear from "A", "B", and "C" of FIG. 7, in case of the encoding, the BLER remains low level in accordance with the lien graph "A", "B", and "C", for obtaining encoding gain, in spite of reducing the SNR. Further, as is clear from "A'", "B'", "C'" of FIG. 7, in case of the non-encoding, a relationship, which the BLER is easy to be low level in accordance with the line graph "A'", "B'", "C'" of FIG. 7 to reduce the SNR, for not obtaining the encoding gain, is stored in the table. Of course, the BLER may be stored in correspondence with each of discrete value of the SNR, and the relationship of the each other may be defined by function. In other words, the stored relationship may be the function (BLERi=Fi(SNR). here, i=A to C, or A' to C').

Next, the throughput expectation value calculation unit 17 refers the selected characteristic table of non-encoding, and calculates error rate $BLER_{relay,A\&F}$ corresponding to the DL Relay SINR (error rate relating from the signal transmission of the base station 10 to the signal processing by the A&F method of the relay station 50 in the DL direction of the relay link) (S13, refer to FIG. 7).

Further, the throughput expectation value calculation unit 17 refers the selected characteristic table of encoding, and calculates error rate $BLER_{relay,D\&F}$ corresponding to the DL Relay SINR (error rate relating from the signal transmission of the base station 10 to the signal processing by the D&F method of the relay station 50 in the DL direction of the relay link) (S14, referring to FIG. 7). It may change the processing order of S13 and S14.

Next, the throughput expectation value calculation unit 17 refers the selected characteristic table of encoding, and calculates error rate $BLER_{access,A\&F}$ corresponding to the DL Access SINR (error rate relating from the relay processing by D&F method of the relay station 50 to the signal processing of the mobile station 70 in the DL direction of the access link) (S15).

And, the throughput expectation value calculation unit 17 calculates error rate $BLER_{access,D\&F}$ (error rate relating from the relay processing by the D&F method of the relay station 50 to the signal processing in the mobile station 70 in the DL direction of the access link), but calculates the error rate $BLER_{access,A\&F}$ and the $BLER_{access,D\&F}$ as same value (S15). The SINR it's self is a SINR of radio, and both of encoded signal and non-encoded signal become same value. And, the mobile station 70 always receives and demodulates the encoded signal in both case of relaying by the A&F method and by the D&F method in the relay station 50, so that the referred characteristic table 161 is the characteristic table of encoding in the both case.

Next, the throughput expectation value calculation unit 17 calculates throughput expectation value of the A&F method (S16). For example, a following calculation formula is used.

$$\alpha_{A\&F} = (1 - BLER_{relay,A\&F}) * (1 - BLER_{access,A\&F}) * Nm * R / D_{A\&F} \quad (1)$$

Here, $\alpha_{A\&F}$ indicates throughput expectation value when the relay station 50 relays by the A&F method, Nm indicates degree of modulation (data bit number included in one subcarrier, for example, Nm=2 in the case of "QPSK", Nm=4 in the case of "16 QAM", or Nm=6 in the case of "64 QAM"), R indicates the encoding rate, and $D_{A\&F}$ indicates the relay delay when the relay station 50 relays by the A&F method. The degree of modulation Nm and encoding rate R are degree of modulation and encoding rate when the base station 10 transmits the signal, respectively (in case of the UL, are degree of modulation and encoding rate when the mobile station 70 transmits the signal, respectively). The degree of modulation Nm, encoding rate R, and the relay delay $D_{A\&F}$ is stored in the memory 16 in advance. And, each of the error rate $BLER_{relay,A\&F}$ and $BLER_{access,A\&F}$ is calculated in S13 and S15. The throughput expectation value calculation unit 17 reads each value from the memory 16, and calculates the throughput expectation value $\alpha_{A\&F}$ of the A&F method using the formula (1).

With respect to the formula (1), the $BLER_{relay,A\&F}$ is error rate of the relay link, therefore, the $(1 - BLER_{relay,A\&F})$ indicates probability of non error. And, the $(1 - BLER_{relay,A\&F}) * (1 - BLER_{access,A\&F})$ indicates probability which can transmit and receive the signal without error from the base station 10 to the mobile station 70 via the relay station 50. In the formula (1), the $(1 - BLER_{relay,A\&F}) * (1 - BLER_{access,A\&F})$ s divided by the relay delay. The formula (1) is consistence with concept of so-called throughput that error rate (denominator of the formula (1) and so on) is high but the relay delay (numerator of the formula (1) and so on) is low, or the error rate is low but the relay delay is high.

Next, the throughput expectation value calculation unit 70 calculation throughput expectation value of the D&F method (S17). A following formula is used.

$$\alpha_{D\&F} = (1 - BLER_{relay,D\&F}) * (1 - BLER_{access,D\&F}) * Nm * R / D_{D\&F} \quad (2)$$

Here, $\alpha_{D\&F}$ indicates throughput expectation value when the relay station 50 relays by the D&F method, and $D_{D\&F}$ indicates the relay delay when the relay station 50 relays by the D&F method.

Two error rates $BLER_{relay,D\&F}$, $BLER_{access,D\&F}$ are calculated by the S14 and S15, respectively. The throughput expectation value calculation unit 17 reads the degree of modulation Nm, encoding rate R, and relay delay of the D&F method $D_{D\&F}$ from the memory 16, and calculates the formula (2) using the error rate calculated by S14 and S15.

Next, the relay technology selection unit 18 compares with two throughput expectation values $\alpha_{A\&F}$ (S16, the formula (1)), $\alpha_{D\&F}$ (S17, the formula (2)) output form the throughput expectation value calculation unit 17 (S18).

Further, when the two throughput expectation values $\alpha_{A\&F}$, $\alpha_{D\&F}$ are compared, if the degree of modulation Nm and error rate R are same value (if the relay station 50 demodulates, encodes, and so on by the same modulation scheme and encoding rate to the base station 10), the formula (1) and (2) can be calculated without the degree of modulation Nm and encoding rate R, and the two throughput expectation values can be compared.

Next, the relay technology selection unit 18 selects the D&F method as the relay technology of the DL direction (S19), if the throughput expectation value $\alpha_{D\&F}$ of the D&F method is higher than the throughput expectation value $\alpha_{A\&F}$ of the A&F method (yes in S18). On the other hand, the relay technology selection unit 10 selects the A&F method as the relay technology of the DL direction (S20), if the throughput expectation value $\alpha_{A\&F}$ of the A&F method is higher than the throughput expectation value $\alpha_{D\&F}$ of the D&F method (no in S18). And, the base station ends the above-mentioned processing (S21).

On the other hand, the throughput expectation value calculation unit 17 selects the SNR-BLER characteristic table 161 corresponding to the MCS information as same manner in the case of the DL direction (S22), if the UL direction is selected ("UL" in S11).

Next, the throughput expectation value calculation unit 17 refers the selected characteristic table of encoding, and calculates the error rate $BLER_{relay,A\&F}$ (error rate relating from the relay processing by the A&F method of the relay station 50 to the signal processing of the base station 10 in the UL direction of the relay link), $BLER_{relay,D\&F}$ (error rate relating from the relay processing by the D&F method of the relay station 50 to the processing of the base station 10, in the UL direction of the relay link) corresponding to the UL Relay SINR output from the UL relay link SINR measurement unit 15 (S23). In this case, same as S15, the two error rates $BLER_{relay,A\&F}$, $BLER_{relay,D\&F}$ are same values. The reason is because the base station 10 decodes the encoded reception signal in cases of relaying by the A&F method and by the D&F method in the relay station 50.

Next, the throughput expectation value calculation unit 17 refers the selected characteristic table of encoding, and calculates error rate $BLER_{access,D\&F}$ corresponding to the UL Access SINR output from the UL access link SINR information extraction unit 12 (error rate relating from the signal transmission of the mobile station 70 to the signal processing by the D&F method of the relay station 50, in the UL direction of the access link) (S24).

And, the throughput expectation value calculation unit 17 refers the selected characteristic table of non-encoding, and calculates error rate $BLER_{access,A\&F}$ corresponding to the UL Access SINR (error rate relating from the signal transmission of the mobile station 70 to the signal processing by the A&F method of the relay station 50, in the UL direction of the access link) (S25). It may change the processing order of S24 and S25.

Next, the throughput expectation value calculation unit 17 calculates the throughput expectation value of the A&F method and the throughput expectation value of the D&F method (S26, S27). The formula (1) and (2) is used in the calculation.

Next, the relay technology selection unit 18 compares the throughput expectation value of the A&F method with the throughput expectation value of the D&F method, and selects the relay technology of the big one of expectation values (S28 to S30). And, the base station 10 ends the above processing (S21).

The relay technology selection unit 18 outputs to the transmission unit 19 the selected relay technology (S19 or S20, S29 or S30) as the relay technology selection information. The transmission unit 19 transmits to the relay station 50 the information (an information noticing the selected relay technology relating to the UL and the DL, respectively). The relay station 50 switches the transfer data by the switching unit 53, based on the selected relay technology. It can be permitted to select difference relay technology in the UL and the DL respectively, and can be suppressed to occur big different of processing time between the UL and the DL by selecting the same relay technology.

In the first embodiment, the base station 10 selects relay technology for which the throughput expectation value is optimal, and the relay station 50 performs the relay processing using the selected relay technology, so that throughput of communication via the relay station 50 improves.

As above mentioned, the base station notices to the relay station whether the relay station may apply a first relay technology which relays without performing the demodulation processing, decoding, encoding, and modulation processing, or the relay station may apply a second relay technology which performs the demodulation processing, decoding, encoding, and modulation processing and relays. The relay station applies the noticed method as the relay technology.

In the first embodiment, the relay technology is selected as the point of improving the throughput, but the relay technology of the relay station is selected as the point of thing other than the throughput. For example, the relay technology selection may be executed by circumstance of an operator. Switching indication of the operator is performed by change of setting to the relay technology selection unit 18, and signal noticing the change is transmitted from the transmission unit 19.

It is convenient that the mobile station may perform the decoding corresponding to the encoding by either one of the base station or the relay station, even if each of switching condition is used, or even if either one of the first relay technology and the second relay technology is adapted. In other words, the mobile station may perform the decoding processing corresponding to the encoding in the base station (the encoding processing does not be performed in the relay station) if the first relay technology is adapted, and the mobile station may perform the decoding processing corresponding to the encoding in the relay station (the encoding performed by the base station is solved by the decoding processing in the relay station) if the second relay technology is adapted.

Further, it may be under consideration one quality, without considering qualities in both radio sections between the base station and the relay station, and between the relay station and the mobile station. For example, the base station adapts the first relay technology if quality of the reception signal from the relay station (or reception quality of the relay station from the base station) is satisfies predetermined criterion, and the base station adapts the second relay technology if not satisfy the predetermined criterion. The reason is because error is easy to occur in the relay link if quality of the relay link is low level, and it is effective that the decoding and error correcting is performed before error in the access link is superimposed.

[Second Embodiment]

Next, the second embodiment is explained bellow. In the first embodiment, the base station 10 calculates the throughput expectation value and selects the relay technology. In the second embodiment, it is an example that the relay station 50 calculates the throughput expectation value and selects the relay technology.

Figure 8:
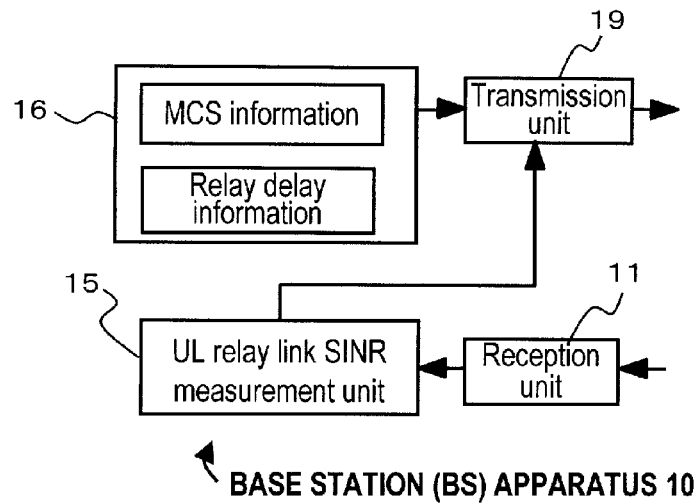
FIG. 8 illustrates another configuration example of a base station (BS) apparatus.
Figure 9:
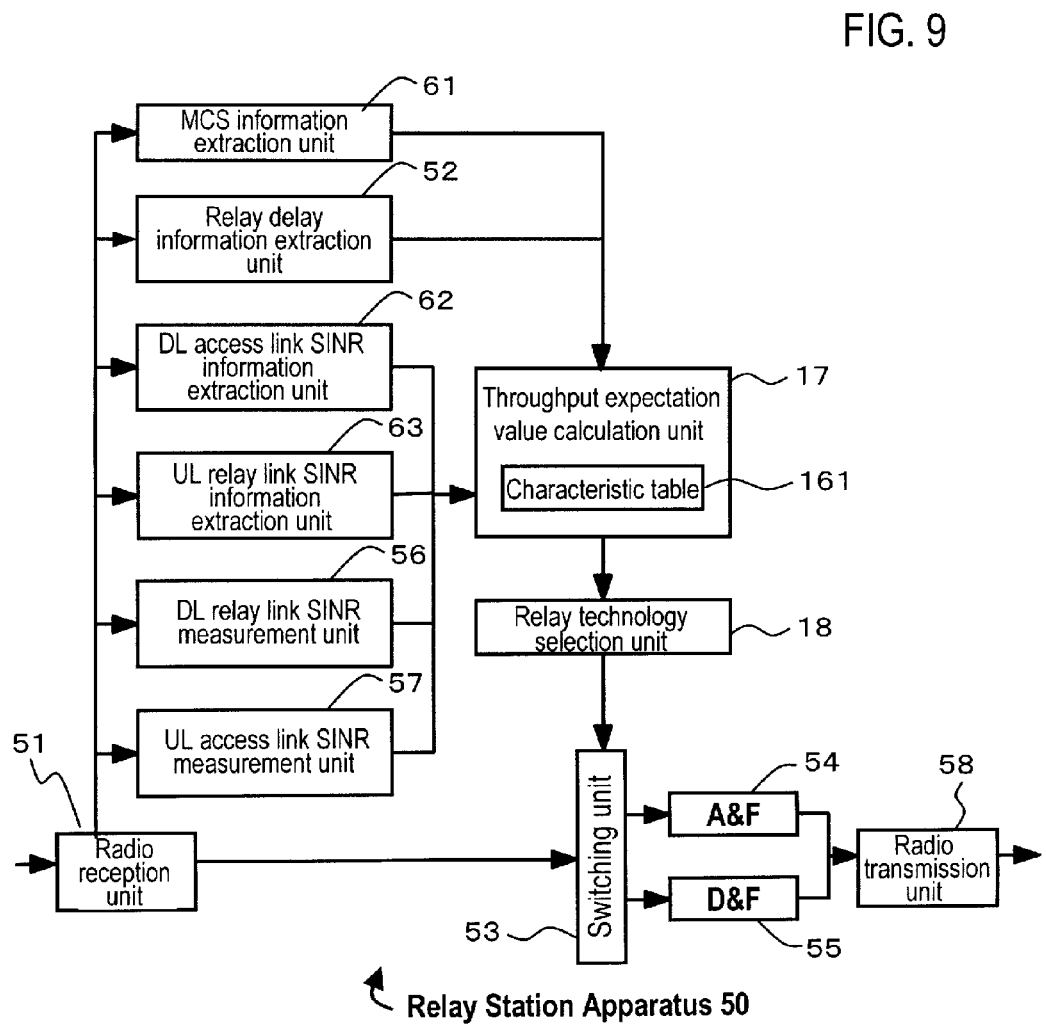
FIG. 9 illustrates another configuration example of a relay station (RS) apparatus.

The whole configuration of the radio relay system 1 is same as the radio relay system of the first embodiment. FIG. 8 illustrates a configuration example of the base station 10, FIG. 9 illustrates a configuration examples of the relay station 50. The configuration of the mobile station 70 is same as the mobile station of the first embodiment (refer to FIG. 5).

As illustrated in FIG. 8, the base station 10 includes the reception unit 11, UL relay link SINR measurement unit 15, memory 16, and transmission unit 19.

The reception unit 11 receives the SINR measurement use signal from the relay station 50, and outputs to the UL relay link SINR measurement unit 15. The UL relay link SINR measurement unit 15 outputs the measured UL Relay SINR to the transmission unit 19.

The transmission unit 19 transmits the UL Relay SINR to the relay station 50. And, the transmission unit 19 reads out the MCS information and the relay delay information from the memory 16, and transmits to the relay station 50.

As illustrated in FIG. 9, the relay station 50 includes a MCS information extraction unit 61, a DL access link SINR information extraction unit 62, a UL relay link SINR information extraction unit 63, the throughput expectation value calculation unit 17, and the relay technology selection unit 18.

The MCS information extraction unit 61 extracts the MCS information from the reception signal received by the radio reception unit 51, and outputs to the throughput expectation value calculation unit 17.

The DL access link SINR information extraction unit 62 extracts the SINR information, transmitted from the mobile station 70, of the DL direction in the access link.

The UL relay link SINR information extraction unit 63 extracts the SINR information, transmitted from the base station 10, of the UL direction in the relay link.

The throughput expectation value calculation unit 17 refers the SNR-BLER characteristic table 161, and calculates the throughput expectation values of the A&F method and the D&F method, based on the each SINR (the DL relay SINR information, the DL access SINR information, the UL access SINR information, and the UL relay SINR information), the MCS information, and the relay delay information. Further, the characteristic table 161 is stored in memory within the throughput expectation value calculation unit 17. The characteristic table 161 may be stored in another memory.

The relay technology selection unit 18 compares the throughput expectation value of the A&F method with the throughput expectation value of the D&F method, selects the relay technology of either one of the A&F method or the D&F method, and outputs selection information to the switching unit 53.

The switching unit 53 switches and outputs the transfer data to either one of the A&F unit 54 or the D&F unit 55, based on the relay technology information.

The calculation of throughput expectation value performed by the throughput expectation value calculation unit 17 and the selection of relay technology performed by the relay technology selection unit 18 are same as the first embodiment (refer to FIG. 6).

In the second embodiment, the relay station 50 selects the relay technology for which the throughput expectation value is optimal, and performs the relay processing, so that the throughput of communication via the relay station 50 improves.

[Third Embodiment]

Next, the third embodiment is explained bellow. In the third embodiment, the relay station 50 performs the calculation of throughput expectation value and the selection of the relay technology like the second embodiment, but it is an example that the calculation of the throughput expectation value becomes simply.

In the first embodiment, the two error rates $BLER_{access,A\&F}$, $BLER_{access,D\&F}$ of the DL direction in the access link are explained as same values (S15 of FIG. 6). The reason is as above explained that the error rate $BLER_{access,A\&F}$, $BLER_{access,D\&F}$ of the DL direction in the access link indicate the error rate from the processing by the A&F method or the D&F method in the relay station 50 to the decoding processing in the mobile station 70, and the mobile station 70 performs the decoding processing even if the relay station 50 performs either one of two methods, so that the two error rates $BLER_{access,A\&F}$, $BLER_{access,D\&F}$ are same.

Thus, the ($1-BLER_{access,A\&F}$) of the formula (1) and the ($1-BLER_{access,D\&F}$) of the formula (2) are same values. Therefore, the formula (1) and (2) are became simply as follow, respectively.

$$\alpha_{A\&F}=(1-BLER_{relay,A\&F})*Nm*R/D_{A\&F} \quad (3)$$

$$\alpha_{D\&F}=(1-BLER_{relay,D\&F})*Nm*R/D_{D*F} \quad (4)$$

Relating to the UL direction, the two error rates $BLER_{relay,A\&F}$, $BLER_{relay,D\&F}$ are same values (S23), so that the ($1-BLER_{relay,A\&F}$) of the formula (1) and the ($1-BLER_{relay,D\&F}$) of the formula (2) are same values. Therefore, in the case of the UL direction the two throughput expectation values $\alpha_{A\&F}$, $\alpha_{D\&F}$ are become simply as follows, respectively.

$$\alpha_{A\&F}=(1-BLER_{access,A\&F})*Nm*R/D_{A\&F} \quad (5)$$

$$\alpha_{D\&F}=(1-BLER_{access,D\&F})*Nm*R/D_{D\&F} \quad (6)$$

Further, in the formula (3) to formula (6), the degree of modulation Nm and the encoding rate R can be omitted.

Figure 10:
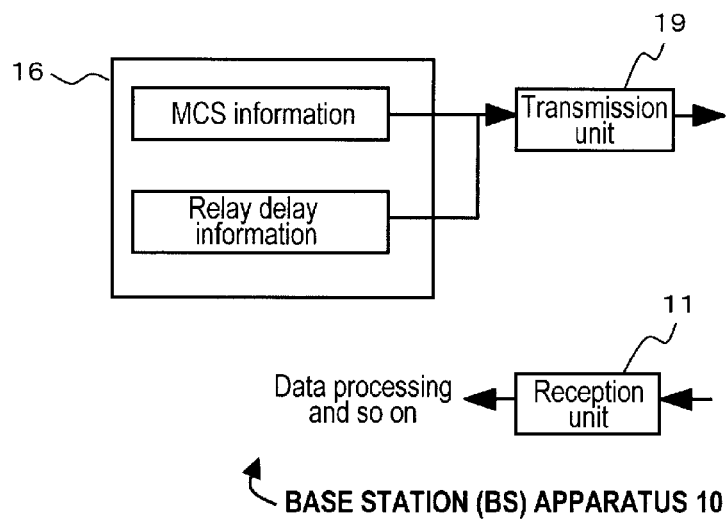
FIG. 10 illustrates another configuration example of a base station (BS) apparatus.
Figure 11:
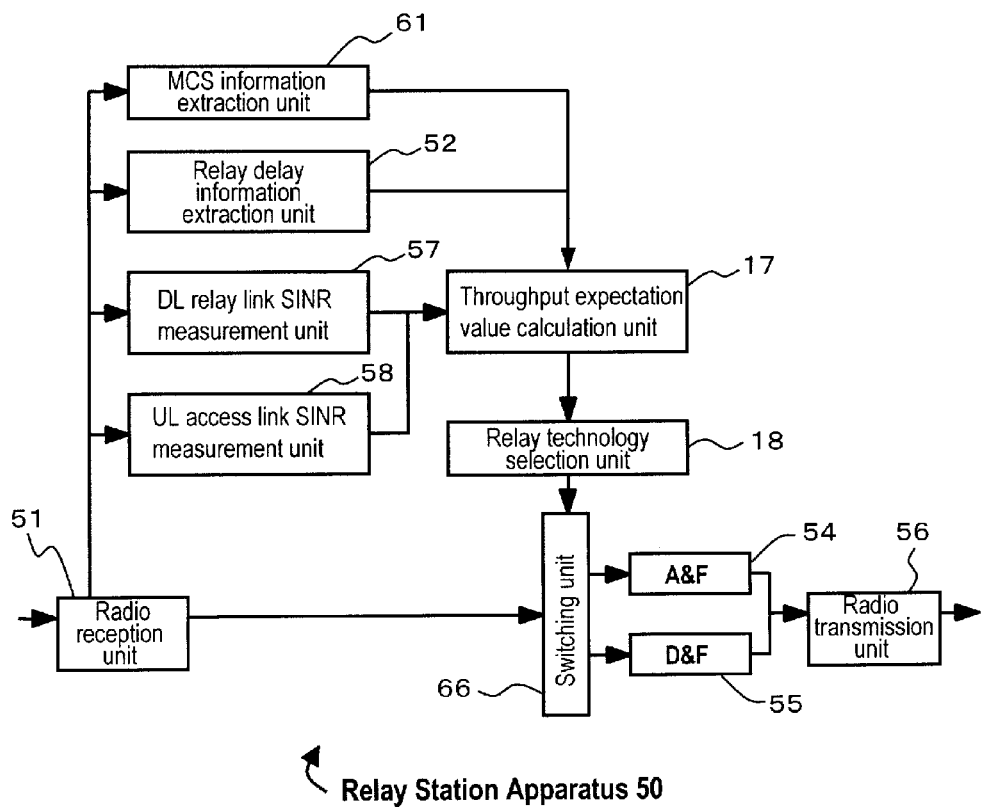
FIG. 11 illustrates another configuration example of a relay station (RS) apparatus.

FIG. 10 illustrates a configuration example of the base station 10 in the third embodiment, and FIG. 11 illustrates a configuration example of the relay station 50. The configuration of the mobile station 70 is same as the configuration of the first embodiment (see, FIG. 5).

The base station 10 includes the reception unit 11, memory 16, and transmission unit 19. The reception unit 11 receives the transfer data and so on transmitted from the relay station 50, and outputs to a data processing unit and so on. The memory 16 stores the MCS information and the relay delay information, and the transmission unit 19 reads out these information and transmits to the relay station 50.

As illustrated in FIG. 11, the relay station 50 includes the DL relay link SINR measurement unit 56, and the UL access link SINR measurement unit 57, and the DL relay link SINR measurement unit 56 and the UL access link SINR measurement unit 57 measure two SINRs (The DL relay link SINR, and UL access link SINR), respectively.

Figure 12:
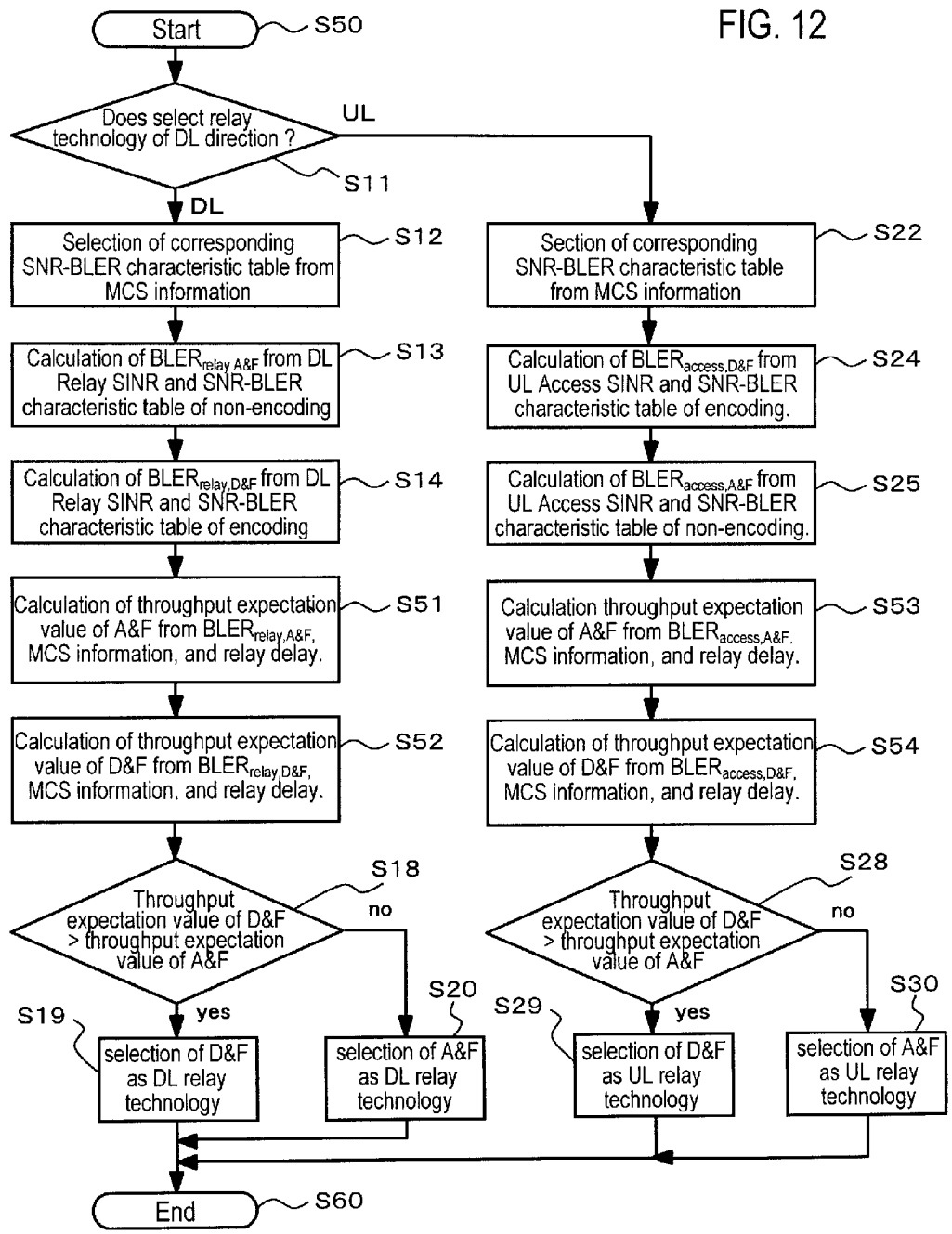
FIG. 12 illustrates a flowchart of another example of a relay technology selection processing.

FIG. 12 illustrates a flowchart indicating a processing example in the throughput expectation value calculation unit 17 and the relay technology selection unit 18. In FIG. 12, same reference number is assigned in same processing of the first embodiment.

The throughput expectation value calculation unit 17 starts the present processing (S50), selects either one of the DL direction or the UL direction (S11), and performs the processing from S12 to S14 in case of the DL direction ("DL" in S11).

Next, the throughput expectation value calculation unit 17 calculates the throughput expectation value of the A&F method (S51). The formula (3) is used in the calculation.

Next, the throughput expectation value calculation unit 17 calculates the throughput expectation value of the D&F method (S52). The formula (4) is used in the calculation.

Next, the relay technology selection unit 18 performs the same processing as the first embodiment (S18 to S20).

On the other hand, if the UL direction is selected ("UL" in S11), the throughput expectation value calculation unit 17 performs the processing from S22 to S25.

Next, the throughput expectation value calculation unit 17 calculates the throughput expectation value of the A&F method (S53). The formula (5) is used in the calculation.

Next, the throughput expectation value calculation unit 17 calculates the throughput expectation value of the D&F method (S54). The formula (6) is used in the calculation.

Next, the relay technology selection unit 18 performs the same processing as the first embodiment (S28 to S30).

In the third embodiment, the relay station 50 selects the relay technology for which the throughput expectation value is optimal, and relays, so that the throughput of communication via the relay station 50 improves.

And, number of the measuring SINR in the third embodiment is less than that in the first embodiment and so on, so that, processing time of the base station 10 and the relay station 50 is early, number of components is little, and cost can be reduced, too.

[An Example of Simulation and the Result]

Next, an example of simulation and a result will be explained. The simulation is performed in the DL direction, and two cases of a case 1 and case 2 are performed as the simulation. FIG. 13 illustrates examples of each parameter value of the SINR in the relay link ($SINR_{relay,A\&F}$, $SINR_{relay,D\&F}$) and the SINR in the access link ($SINR_{access,A\&F}$, $SINR_{access,D\&F}$), and FIG. 14 is examples of two relay delays $D_{A\&F}$, $D_{D\&F}$ of the A&F method and the D&F method. And, FIG. 15 illustrates an example of the characteristic table 161.

As illustrated in FIG. 13, in the present simulation, it is assumed that the SINR in the access link is same with the two cases and the SINR in the relay link is difference. For example, it is a case that distance between the relay station 50 and the mobile station 70 is same with the case 1 and case 2, and the distance between the base station 10 and the relay station 50 is closer in the case 2 than the case 1.

Figure 15:
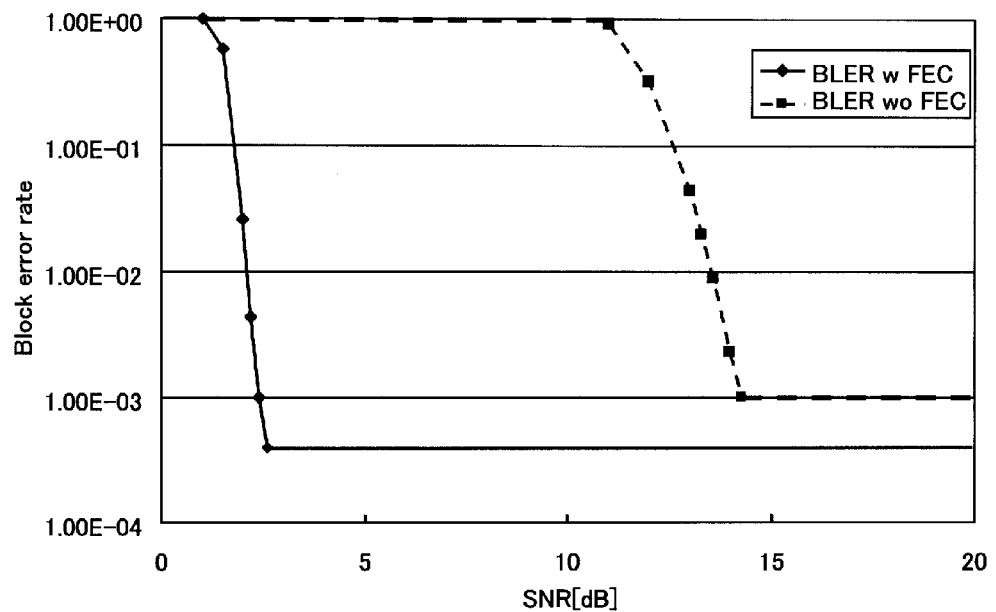
FIG. 15 illustrates another example of SNR-BLER characteristic table.

And, the characteristic table 161 illustrated in FIG. 15 is example of the characteristic table (solid line) of encoding in case that the modulation scheme is "QPSK" and encoding rate (R) is "1/2", and the characteristic table (dotted line) of non-encoding, respectively.

Figure 16:
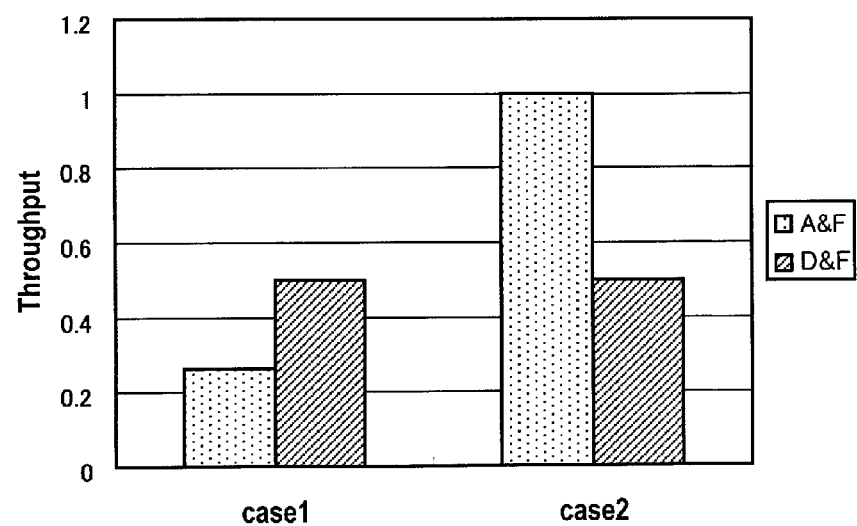
FIG. 16 illustrates an example of simulation result.

In that case, it is simulated in case that the radio relay system 1 is set in AWGN (Additive White Gaussian Noise) environment (so-called rest environment). FIG. 16 illustrates an example of the simulation result. In FIG. 16, dotted line indicates the result in case of the A&F method, and diagonal line indicates the result in case of the D&F method.

In the D&F method, Same throughputs are obtained in the two cases in both. The reason is because the error rate reduces for the error correction and the relay processing is performed in the relay station 50. On the other hand, the signal is relayed without performing the error correction in the A&F method, so that two difference throughputs are obtained in the two cases.

Further, the throughput of the D&F method obtained gain of error correction is higher than the throughput of the A&F method in the case 1 in which the SINR is low. On the other hand, the throughput of the A&F method in which the relay delay is short is higher that the throughput of the D&F method in the case 2 in which the SINR is high. Thus, the throughput improves by switching the A&F method and the D&F method in correspondence with the SINR in the relay station 50, compared with case of non-switching.

[Calculation Formula of the throughput Expectation Value]

The formulas of the throughput expectation value (formula (1) to formula (6)) are generalized, furthermore.

The formula (1) (the calculation formula of the throughput expectation value of the A&F method in the DL direction and the UL direction) and formula (2) (the calculation formula of the throughput expectation value of the D&F method in the DL direction and the UL direction) are generalized with a following formula.

$$\alpha = (1-\beta_{relay})*(1-\beta_{access})*Nm*R/D \qquad (7)$$

Here, $\beta_{relay}$ indicates error rate in the each relay method calculated from the SINR in the relay link, $\beta_{access}$ indicates error rate in the each relay method calculated from the SINR in the access link. $\beta_{relay}$ corresponds to the error rate $BLER_{relay,A\&F}$ of the formula (1) and to the error rate $BLER_{relay,D\&F}$ of the formula (2). And, $\beta_{access}$ corresponds to the error rate $BLER_{access,A\&F}$ of the formula (1) and to the error rate $BLER_{access,D\&F}$ of the formula (2).

Further, the formula (3) to the formula (6) are generalized with a following formula.

$$\alpha = (1-\beta)*Nm*R/D \qquad (8)$$

Here, $\beta$ indicates error rate prior to the relay (error rate of the DL direction in the relay link, or error rate of the UL direction in the access link), and corresponds to $BLER_{relay,A\&F}$ of the formula (3) (the throughput expectation value calculation formula of the A&F method in the DL direction) and to $BLER_{relay,D\&F}$ of the formula (4) (the throughput expectation value calculation formula of the D&F method in the DL direction).

The throughput expectation value calculation unit 17 can calculate the each throughput expectation value using the formula (7) or the formula (8). The throughput expectation value calculation unit 17 stores the calculation formulas in an inside memory, and executes by reading out the calculations upon processing.

[Another Embodiments]

In the first and second embodiments, it is explained that the throughput expectation value calculation unit 17 and the relay technology selection unit 18 are included in the base station 10 and the relay station 50. For example, the throughput expectation value calculation unit 17 may be included in the base station 10, and the relay technology selection unit 18 may be included in the relay station 50. In this case, the base station 10 transmits the calculated throughput expectation value, and the relay station 50 selects the relay technology.

Further, the four kind of the SINR are all measured in the first embodiment. The SINRs of the relay link obtain same values if the SINRs of the relay link in the DL direction and the UL direction are measured at the same time. The access link is same as the relay link. Thus, the SINR is measured either one of the DL direction or the UL direction in each link, and the base station 10 may calculate the throughput expectation value. In this case, the base station 10 may include either one of the DL relay link SINR information extraction unit 14 or the UL relay link SINR measurement unit 15, and may include either one of the UL access link SINR information extraction unit 12 or the DL access link SINR information extraction unit 13. And, the relay station 50 may include either one of the DL relay link SINR measurement unit 56 or the UL access link SINR measurement unit 57, or may not include both.

Furthermore, it is explained that the characteristic table 131 indicates the relationship of the SNR and the error rate in the first embodiment to the third embodiment. For example, the characteristic table 131 may be a table indicating relationship of the SINR and the error rate. The throughput expectation value calculation unit 17 can calculate directly the error rate from the measured and so on SINR by referring to the characteristic table 161.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A radio relay method relaying signal transmitted and received between a base station apparatus and a mobile station apparatus, the radio relay method comprising:

calculating throughput expectation values in a case of using a first relay method and a second relay method respectively, based on error rate calculated from each reception quality between a relay station apparatus relaying a radio signal and the base station apparatus and between the relay station apparatus and the mobile station apparatus, and on relay delay of the first relay method amplifying and transmitting the radio signal and the second relay method decoding, error correcting, re-encoding, and transmitting the radio signal respectively;

selecting one relay method of which a throughput expectation value is higher than another relay method; and relaying the radio signal based on the selected relay method;

wherein the error rate includes a first error rate calculated from a reception quality by referring to a first characteristic table corresponding to the first relay method, and a second error rate calculated from a reception quality by referring to a second characteristic table corresponding to the second relay method.

2. The radio relay method according to claim 1, wherein the throughput expectation value of the first or the second relay method is calculated by using a following formula:

$$\alpha = (1-\beta_{relay})*(1-\beta_{access})*Nm*R/D,$$

in which the throughput expectation value denotes α, error rate, of the error rate, of the first or second relay method between the base station apparatus and the relay station apparatus denotes $\beta_{relay}$, error rate, of the error rate, of the first or second relay method between the relay station apparatus and mobile station apparatus denotes $\beta_{access}$, degree of modulation corresponding to modulation scheme when the base station apparatus or the mobile station apparatus transmits the radio signal denotes Nm, encoding rate when the base station apparatus or the mobile station apparatus transmits the radio signal denotes R, and relay delay of the first or second relay method denotes D.

3. The radio relay method according to claim 1, wherein the throughput expectation value of the first or second relay method is calculated by using a following formula:

$$\alpha=(1-\beta)*Nm*R/D,$$

in which the throughput expectation value denotes α, error rate, of the error rate, of the first or second relay method in each of downlink direction between the base station apparatus and the relay station apparatus or uplink direction between the relay station apparatus and the mobile station apparatus denotes β, degree of modulation corresponding to modulation scheme when the base station apparatus or the mobile station apparatus transmits the radio signal denotes Nm, encoding rate when the base station apparatus or the mobile station apparatus transmits the radio signal denotes R, and relay delay of the first or second relay method denotes D.

4. The radio relay method according to claim 1, wherein the throughput expectation value is calculated, based on degree of modulation corresponding to modulation scheme when the base station apparatus or the mobile station apparatus transmits the radio signal, and on error rate of the radio signal.

5. The radio relay method according to claim 1, wherein the first and second error rate calculated from the reception quality of downlink direction between the relay station apparatus and the mobile station apparatus, or uplink direction between the relay station apparatus and the base station apparatus, are same value, when the error rate is calculated by referring to the second characteristic table.

6. The radio relay method according to claim 1, wherein the error rate is the first and second error rate of downlink direction between the base station apparatus and the relay station apparatus, and the first and second error rate of uplink direction between the relay station apparatus and the mobile station apparatus.

7. A relay station apparatus for relaying signal transmitted and received between a base station apparatus and a mobile station apparatus:
   wherein the relay station apparatus calculates throughput expectation values in each case of using a first relay method and a second relay method, based on error rate calculated from each reception quality between the relay station apparatus and the base station apparatus and between the relay station apparatus and the mobile station apparatus, and on each relay delay of the first relay method amplifying and transmitting reception signal and the second relay method decoding, error correcting, re-encoding, and transmitting the reception signal;
   wherein the relay station apparatus selects a relay method of which a throughput expectation value is higher than another relay method; and
   wherein the relay station apparatus processes the reception signal by using the selected relay method;
   wherein the error rate includes a first error rate calculated from a reception quality by referring to a first characteristic table corresponding to the first relay method, and a second error rate calculated from a reception quality by referring to a second characteristic table corresponding to the second relay method.

* * * * *